US006472018B1

(12) United States Patent
Warnes et al.

(10) Patent No.: US 6,472,018 B1
(45) Date of Patent: Oct. 29, 2002

(54) THERMAL BARRIER COATING METHOD

(75) Inventors: Bruce M. Warnes, Muskegon; Joel Lee Cockerill, Montague; John Edward Schilbe, Whitehall, all of MI (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 09/511,857

(22) Filed: Feb. 23, 2000

(51) Int. Cl.$^7$ .............................................. C23C 16/06
(52) U.S. Cl. ................ 427/250; 427/255.34; 427/255.7
(58) Field of Search ................................. 427/250, 253, 427/255.7, 255.34

(56) References Cited

U.S. PATENT DOCUMENTS

| | | | |
|---|---|---|---|
| 3,873,347 A | | 3/1975 | Walker et al. |
| 4,931,102 A | | 6/1990 | Burke |
| 5,236,745 A | | 8/1993 | Gupta et al. |
| 5,384,200 A | | 1/1995 | Giles et al. |
| 5,626,674 A | | 5/1997 | VanKuiken, Jr. et al. |
| 5,658,614 A | | 8/1997 | Basta et al. |
| 5,671,532 A | | 9/1997 | Rao et al. |
| 5,683,825 A | | 11/1997 | Bruce et al. |
| 5,716,720 A | * | 2/1998 | Murphy ...................... 428/623 |
| 5,759,640 A | | 6/1998 | Mannava et al. |
| 5,792,521 A | | 8/1998 | Wortman |
| 5,817,372 A | | 10/1998 | Zheng |
| 5,856,027 A | | 1/1999 | Murphy |
| 5,876,860 A | * | 3/1999 | Marijnissen et al. ......... 428/623 |
| 6,132,520 A | * | 10/2000 | Schilbe ........................ 427/404 |
| 6,194,026 B1 | * | 2/2001 | Warnes et al. ............... 427/435 |
| 6,287,644 B1 | * | 9/2001 | Jackson et al. .............. 427/566 |

OTHER PUBLICATIONS

Joseph K. Doychak; The Evolution and Growth of Al$_2$O$_3$ Scales on Beta–NiAl; NASA Contractor Report #CR–175097, May 1986; pp. 1–239.

D.M Lipkin, H. Schaffer, F. Adar, D.R. Clarke; Lateral Growth Kinetics of alpha–Alumina Accompanying the Formation of a Protective Scale on (111) NiAl During Oxidation at 1100°C; Materials Dept., Univ. of California, Feb. 4, 1997; pp. 1–10; Applied Physics Letters vol. 70 No. 19 (1997) pp. 2550–2552.

E. Jordan, D. Pease, M. Gell; Bond Strength and Stress Measurements in Thermal Barrier Coatings; Clemson University Research Foundation Subcontract #95–01–SR030, Apr. 1, 1997–Sep. 30, 1997, pp. 1–65; U.S. Department of Energy Report #DOE/MC/29061-96/00676.

Philip Vais and Robert A. Rapp; Cyclic Oxidation of Oxide Thermal Barrier Coatings; Material Science and Engineering, The Ohio State University, May 18, 1998; pp. 1–9; Electric Power Research Institute Report # TR112440 (1998).

B.H. Kear, F.S. Pettit, D.E. Fornwalt, L.P. Lemaire; On the Transient Oxidation of a Ni–15Cr–6Al Alloy; Oxidation of Metals vol. 3, No. 6, 1971; pp. 557–569.

S.J. Wilson and J.D.C. McConnell; A Kinetic Study of the System Gamma–AlOOH/Al$_2$O$_3$; Journal of Solid State Chemistry, 34, 1980; pp. 315–322.

B.A. Pint, A. Jain, L.W. Hobbs; The Effect of Ion Implanted Elements on the Theta to Alpha Phase Transformation of Al$_2$O$_3$ Scales Grown on Beta–NiAl; Mat. Res. Soc. Symp. Proc., vol. 288, 1998; pp. 1013–1018.

O. Unal, T.E. Mitchell, and A.H. Heuer; Microstructures of Y$_2$O$_3$—Stabilized ZrO$_2$ Electron Beam–Physical Vapor Deposition Coatings on Ni–Base Superalloys; Journal of the American Ceramic Society, vol. 77, No. 4, Apr. 1994; pp. 984–992.

E.H. Jordan, M. Gell, D.M. Pease, L. Shaw, D.R. Clarke, V. Gupta B. Barber, K. Vaidyanathan; Bond Strength and Stress Measurements in Thermal Barrier Coatings; International Gas Turbine & Aeroengine Congress & Exhibition, Jun. 2–5, 1997; pp. 1–7.

V.K. Tolpygo and H.J. Grabke; The Effect of Impurities on the Alumina Scale Growth: An Alternative View: Scripta Materialia, vol. 38, No. 1, Sep. 4, 1997; pp. 123–129.

A. Maricocchi, A. Bartz, D. Wortman; PVD TBC Experience on GE Aircraft Engines; Journal of Thermal Spray Technology, vol. 6, No. 2, Jun. 1997; pp. 1–11.

* cited by examiner

Primary Examiner—Bret Chen

(57) ABSTRACT

An outwardly grown diffusion aluminide bondcoat is formed on a superalloy substrate and has higher concentrations of Al and Pt and lower concentrations of harmful impurities (e.g. Mo, W, Cr, Ta, S, etc.) at an outermost region of the bondcoat than at an innermost region thereof adjacent the substrate. The bondcoat is pretreated prior to deposition of a ceramic thermal insulative layer in a manner that reduces grain boundary ridges on the outermost bondcoat surface without adversely affecting the outermost region thereof, and then is heat treated to thermally grow a stable alpha alumina layer on the bondcoat prior to deposition of a ceramic layer.

14 Claims, 8 Drawing Sheets

MDC-150L As Coated

MDC-150L  10min. Media Bowl

MDC-150L  30min. Media Bowl

MDC-150L   20psi Vapor Hone

MDC-150L   60psi Vapor Hone

MDC-150L 20psi Blast

MDC-150L 40psi Blast

THERMAL BARRIER COATING METHOD

FIELD OF THE INVENTION

The present invention relates to thermal barrier coatings for components, such as gas turbine engine blades and vanes, wherein the thermal barrier coating exhibits improved coating life.

BACKGROUND OF THE INVENTION

Advancements in propulsion technologies have required gas turbine engines to operate at higher temperatures. This increase in operating temperature has required concomitant advancements in the operating temperatures of metal (e.g. superalloy) turbine engine components. Thermal barrier coatings have been used to meet these higher temperature requirements. Typical thermal barrier coatings comprise alumina and/or zirconia based ceramic which provide a thermal insulative layer to protect the metal component from the high temperatures.

Thermal barrier coatings have been applied to metal components by first coating the component with a bondcoat, which may comprise an inwardly or outwardly grown platinum modified diffusion aluminide bondcoat and/or MCrAlY overlay bondcoat where M is Ni and/or Co. After applying the bondcoat, the coated component typically is grit blasted and vacuum heat treated, or vice versa, to promote the formation of a thermally grown oxide (TGO) layer typically comprising alumina on the aluminum-rich underlying bondcoat. The component then is coated by electron beam physical vapor deposition with a thermal insulative layer of alumina, zirconia, or other ceramic material. For example, U.S. Pat. Nos. 5,716,720 and 5,856,027 describe a thermal barrier coating system comprising a clean platinum modified diffusion aluminide bondcoat on the substrate, a thermal grown alumina layer, and a thermal insulative ceramic layer on the alumina layer. The platinum modified diffusion aluminide bondcoat comprises an outwardly grown diffusion aluminide coating produced by CVD (chemical vapor deposition) processing using high substrate temperature and low activity coating gases that produce higher concentrations of Pt and Al and low concentrations of harmful refractory metal impurities (e.g. Mo, W, Cr, Ta, etc.) and surface active impurities (e.g. S,. P, Cl, B, etc.) at the outermost zone or region of the aluminide coating.

The life of a thermal barrier coating; i.e. time to coating spallation, is known to be related to the surface characteristics of the bondcoat and the particular phase of the thermally grown alumina present between the insulative layer and the bondcoat. Negative effects of bondcoat surface roughness on coating life have been reported by Jordan in "Bondcoat Strength and Stress Measurements in Thermal Barrier Coatings", US Department of Energy Report (subcontract #95-01-SR030), Sep. 30, 1997, where it was reported that platinum aluminide bondcoat surfaces include grain boundary ridges that act as sites for stress concentration and damage accumulation during thermal cycling of thermal barrier coated substrates. Grain boundary ridges act as sites for preferential oxidation, void formation, and crack initiation which result in the thermally grown alumina spalling prematurely.

The formation of the thermally grown alumina layer on the aluminum-rich bondcoat involves several metastable transition phases, such as a cubic gamma alumina phase transforming to a tetragonal delta alumina phase then to a monoclinic theta alumina phase finally to a rhombohedral alpha alumina phase, the formation of which occurs by heterogeneous nucleation and growth of the alpha phase from the monoclinic theta phase. The sum of the metastable transitions involves a substantial molar volume reduction of approximately 9%, a significant portion of which is attributable to the final transition from the theta phase to alpha phase.

An object of the present invention is to provide a method of pretreating a superalloy or other substrate prior to coating with a thermal insulative layer of a thermal barrier coating system in a manner to reduce adverse effects of bondcoat surface roughness on life of the thermal barrier coating.

Another object of the present invention is to provide a method of pretreating a superalloy or other substrate prior to coating with a thermal insulative layer of a thermal barrier coating system in a manner to reduce adverse effects of metastable phases of thermally grown alumina on life of the thermal barrier coating.

A still further object of the present invention is to significantly increase the life of the thermal barrier coating system under high temperature cyclic oxidation conditions.

SUMMARY OF THE INVENTION

The present invention involves forming on a superalloy or other metallic substrate an outwardly grown diffusion aluminide bondcoat that has higher concentrations of Al and optionally Pt and lower concentration of a harmful refractory metal impurity (e.g. Mo, W, Cr, Ta, etc.) at an outermost zone or region of the bondcoat than at an innermost zone or region thereof and pretreating the bondcoat by repetitively moving the bondcoated substrate in contact with abrasive media in a container to reduce bondcoat grain boundary ridges, while leaving at least a portion, preferably all, of the outermost Al-rich zone or region of the original Al-rich bondcoat. The repetitive moving can be achieved by media bowl polishing.

The present invention also involves heat treating the pretreated bondcoated substrate under temperature and time conditions in air to form a stable alpha alumina layer on the bondcoat prior to deposition of the ceramic thermal insulative layer.

A thermal barrier coating system formed pursuant the present invention exhibits a significant increase in coating life (time to coating spallation) in cyclic oxidation tests at elevated temperatures.

The above objects and advantages of the present invention will become more readily apparent from the following description taken with the following drawings.

DESCRIPTION OF THE INVENTION

An exemplary embodiment of the present invention involves forming on a superalloy or other metallic substrate an outwardly grown platinum modified diffusion aluminide bondcoat that has higher concentrations of Al and Pt and lower concentrations of harmful refractory metal impurities (e.g. Mo, W, Cr, Ta, etc.) at an outermost zone or region of the bondcoat than at an innermost zone or region thereof and pretreating the bondcoated substrate in a manner that reduces bondcoat grain boundary ridges, and then to form a stable alpha alumina layer on the bondcoat prior to deposition of the thermal insulative layer in a manner that significantly increases coating life.

The substrate can comprise nickel and cobalt superalloy and other metallic substrates which may comprise equiaxed, directionally solidified and single crystal castings as well as other forms of these materials, such as forgings, pressed powder components, machined components, and other forms. For example only, the substrate may comprise the well known Rene' N5 nickel base superalloy having a composition of Ni-7.0% Cr-6.2% Al-7.5% Co-6.5% Ta-1.5% Mo-5.0% W-3.0% Re-0.15% Hf-0.05%C-0.018% Y (where % is in weight %) used for making single crystal turbine blades and vanes. Other nickel base superalloys which can be used include, but are not limited to, MarM247, CMSX-4, PWA 1422, PWA 1480, PWA 1484, Rene' 80, Rene' 142, and SC 180. Cobalt based superalloys which can be used include, but are not limited to, FSX-414, X-40, MarM509 and others.

The bondcoat preferably comprises an outwardly grown platinum modified diffusion aluminide bondcoat that has higher concentrations of Al and Pt and lower concentrations of harmful refractory metal impurities (e.g. Mo, W, Cr, Ta, etc.) at the outermost zone or region of the bondcoat than at the innermost zone or region thereof. The outwardly grown platinum modified diffusion aluminide bondcoat is formed by first electroplating a platinum layer on the substrate using an alkali or alkaline earth hydroxide platinum plating solution as described in U.S. Pat. No. 5,788,823, the teachings of which are incorporated herein by reference. The platinum coated substrate then is subjected to a chemical vapor deposition (CVD) process described in U.S. Pat. Nos. 5,658,614 and 5,989,733, the teachings of which are incorporated herein by reference. The CVD process described in the these patents uses an aluminum trichloride coating gas in a hydrogen carrier gas at a substrate coating temperature of at least 1832 degrees F. to form the outwardly grown platinum modified diffusion aluminide bondcoat. The bondcoat comprises an innermost diffusion zone or region adjacent the substrate and an outermost additive layer zone or region formed by outward diffusion of nickel from the substrate and its subsequent reaction with aluminum from the coating gas ($AlCl_3$)

Figure 1:
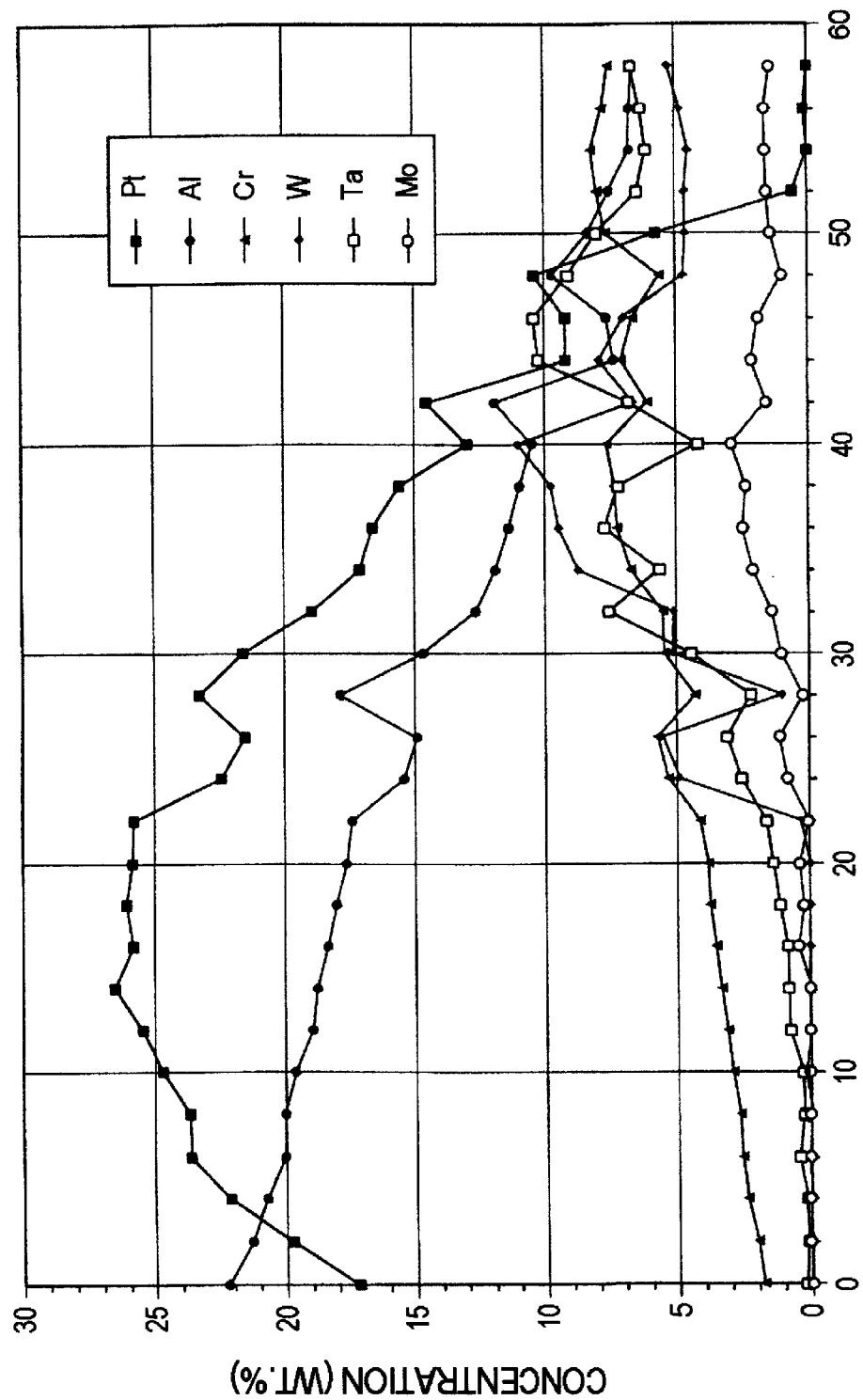
FIG. 1 is a graph of concentrations, in weight %, of Pt, Al, Cr, W, Ta, and Mo across the thickness of a platinum modified diffusion aluminide bondcoat with 0 thickness being the outer surface of the bondcoat.

An exemplary outwardly grown platinum modified diffusion aluminide bondcoat pursuant to the invention (designated MDC-150L) formed on Rene' N5 nickel base superalloy has higher concentrations of Pt and Al and lower concentrations of harmful refractory metal impurities (e.g. Mo, W, Cr, Ta, etc.) at the outermost region (additive layer) of the bondcoat than at the innermost region thereof as illustrated in FIG. 1, which is a graph of concentrations, in weight %, of Pt, Al, Cr, W, Ta, and Mo across the thickness of the platinum modified diffusion bondcoat where about 0 microns to 30 microns distance inwardly through the bondcoat corresponds to the outermost additive layer or zone and about 35 microns to about 50 microns inwardly corresponds to an innermost diffusion zone. The outwardly grown platinum modified diffusion aluminide coatings of the type described above and in U.S. Pat. Nos. 5,658,614 and 5,989,733 are preferred since they include the outermost additive layer or zone that is relatively clean and purified (i.e. having reduced concentrations of refractory metal and surface active impurities) as a result of outward coating growth and purification by gas-solid reactions during CVD coating such that a pure, thermodynamically stable alpha alumina scale or layer can be formed thereon by heat treatment in air without transient oxidation or spinel formation. Since refractory metal impurities in the bondcoat hinder formation of the desired high purity alpha alumina phase on the bondcoat, their reduced concentration in the outermost additive layer helps minimize harmful doping effects that refractory elements may produce when dissolved in the alpha alumina scale. In addition, reduction of surface active impurities improves aluminum adherence to the bondcoat.

In the outer additive layer of the bondcoat, the Pt and Al concentrations typically are in the ranges of 12 to 30 weight % Pt and 15 and 28 weight % Al, respectively, while being 0 to 8 weight % Pt and 4 to 12 weight % Al, respectively, at the innermost region of the bondcoat adjacent the substrate. The refractory metal impurities, such as Mo, W, Cr, Ta, etc.) typically each are present in an amount less than about 1 weight % for Mo, W, and Ta and less than 3 weight % for Cr in the outermost additive layer, while being present at their respective nominal alloy concentrations in the diffusion zone at the innermost diffusion zone or region adjacent the substrate. The refractory metal impurities in the bondcoat originate from the underlying superalloy substrate via outward diffusion from the substrate.

For purposes of illustration and not limitation, the exemplary bondcoat chemistry profile shown in FIG. 1 was formed on the Pt plated Rene' N5 substrate using the following coating parameters: coating gas comprising 9 volume % aluminum trichloride and 91 volume % hydrogen at a flow rate of 300 scfh and total pressure of 150 torr and substrate temperature of 1975 degrees F. for a coating time of 16 hours without prediffusion of a platinum layer thereon. Prior to CVD aluminizing, the substrate was electroplated with the platinum layer comprising 9–11 milligrams/$cm^2$ of Pt using an alkali or alkaline earth hydroxide plating bath having a bath composition comprising an aqueous KOH solution with 10 grams Pt per liter and electrical current of less than 20 mA/$cm^2$, as taught in U.S. Pat. No. 5,788,823 incorporated herein by reference.

In accordance with an embodiment of the invention, the outwardly grown platinum modified diffusion aluminide bondcoat on the substrate is treated in a manner that reduces grain boundary ridges on the outermost bondcoat surface, while leaving at least a portion and preferably all of the Pt and Al-rich outermost zone or region (outer additive layer), and then to form a stable alpha alumina layer on the bondcoat prior to deposition of the ceramic thermal insulative layer thereon.

For purposes of illustration and not limitation, the outermost surface of the bondcoat was subjected to different surface treatments comprising media bowl polishing and vapor honing. The outermost surface of the bondcoat also was grit blasted for comparison purposes representative of conventional grit blasting treatment used heretofore to eliminate transient oxide formation on both inwardly and outwardly grown Pt modified diffusion bondcoats and MCrAlY type overlay bondcoats preparatory to deposition of ceramic insulative coating.

Media bowl polishing of the bondcoat surface pursuant to an embodiment of the invention involved placing the bondcoated substrate in a bowl having commercially available angle cut, cylindrical alumina polishing media of ⅝×⅝ inch particle size and vibrating the bowl such that the bondcoat outermost surface was vibratory polished for a time of 5 minutes. Media bowl polishing of the bondcoat was conducted in equipment and using alumina media commercially available from Sweco Inc., Florence, Ky. For example, a Sweco model FMD20HA media bowl polishing device operates at a frequency of vibration of 1200 cycles/minute with a vertical amplitude range of ⅛–⅜ inch and horizontal amplitude range of ⅛–¼ inch. Media bowl polishing repetitively moves the bondcoated substrate and abrasive media in contact in a container (bowl) by vibration of the container.

Vapor honing of the bondcoat surface involved impinging the bondcoat outermost surface with vapor comprising water and commercially available −600 grit Novaculite particles at a pressure of 30 psi for a time of 5 minutes. Vapor honing of the bondcoat was conducted in equipment commercially available from Vapor Blast Manufacturing Company, Milwaukee, Wis.

Grit blasting of the bondcoat surface involved impinging the bondcoat outermost surface with abrasive alumina grit particulates having a particle size of 220–240 grit at a pressure of 20 psi for a time of ¾ minute. Grit blasting of the bondcoat was conducted in equipment commercially available from Empire Abrasive Equipment Company, Langhorn, Pa.

After media bowl polishing, the bondcoated substrates were subjected to heat treatment at 1975 degrees F. for sufficient time (determined from FIG. 8) in air to form a stable thermally grown alpha alumina layer and then conventionally coated in an electron beam-physical vapor deposition (EB-PVD) coater with yttria stabilized zirconia insulative layer to a thickness of 0.005–0.007 inch (127–178 micrometers). Grit blasted samples received a vacuum heat treatment at 1925 degrees F. for 2 hours similar to U.S. Pat. No. 5,716,720 prior to coating. Vapor honed samples were treated with molten KOH to remove embedded Novaculite particles and air heat treated at 1975 degrees F. for 3.75 hours prior to coating.

Figure 8:
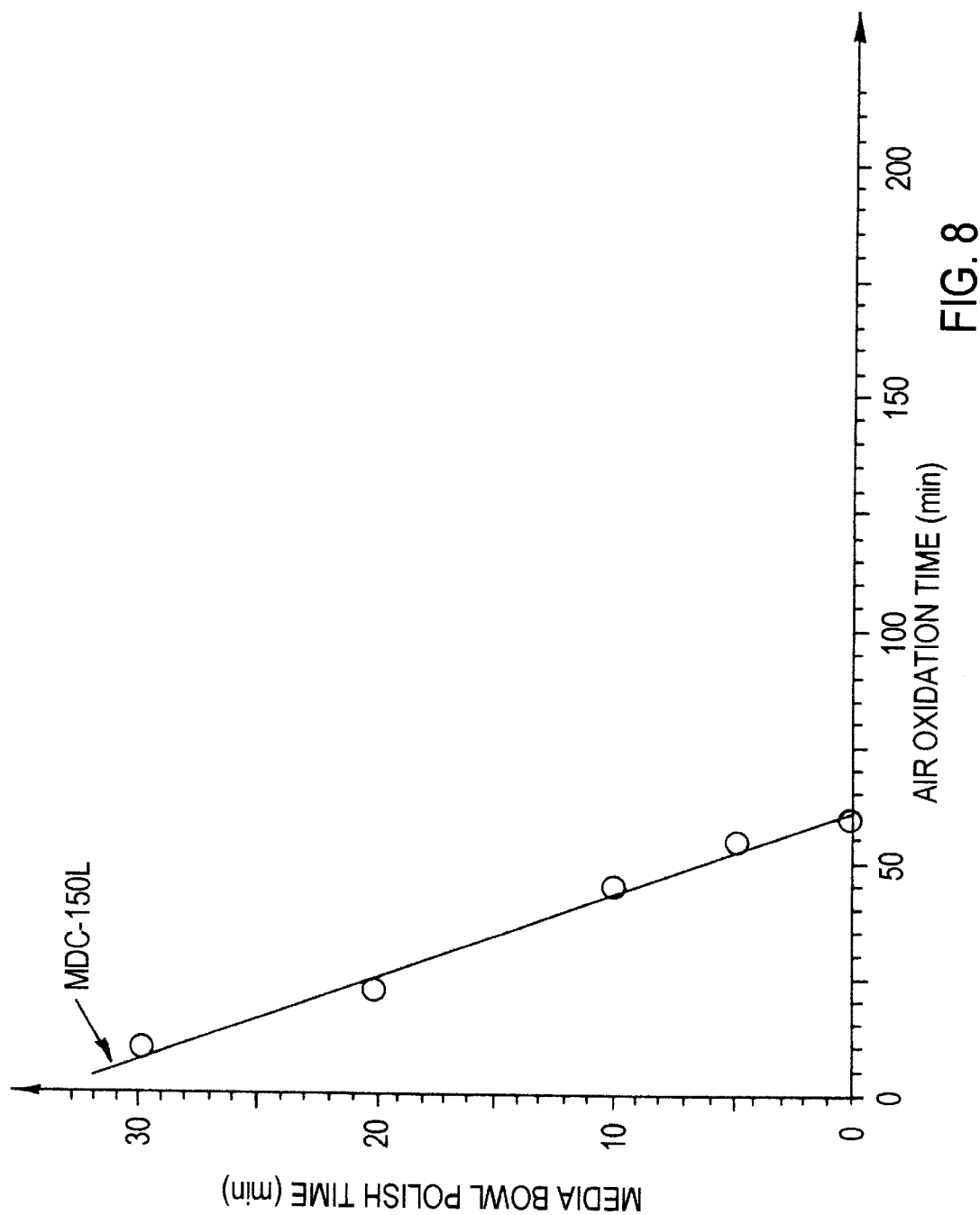
FIG. 8 is a graph of air oxidation time (transformation finish time) needed to form stable alpha alumina in air at 1975 degrees F. versus the time of media bowl polishing.

The heating time in air that is sufficient to form stable alpha alumina on the coating of media bowl polished samples depended on the time of media bowl polishing (i.e. amount of work imparted to the coating surface), FIG. 8, where it can be seen that increased media bowl polishing time decreases the time needed to form the stable alpha alumina at 1975 degrees F.

The thermal barrier coated substrates then were tested in cyclic oxidation in test cycles where each cycle was 60 minutes in duration consisting of exposure to 2075 degrees F. for 50 minutes in air followed by 10 minutes of cooling in air to below 400 degrees F. A thermal barrier coated substrate was considered failed when 20% of the thermal barrier coating on the outermost surface was spalled. The cyclic oxidation tests involved testing 3 specimens of each thermal barrier coated substrate with the lives of the specimens averaged and appearing in FIGS. 2 and 3.

Figure 2:
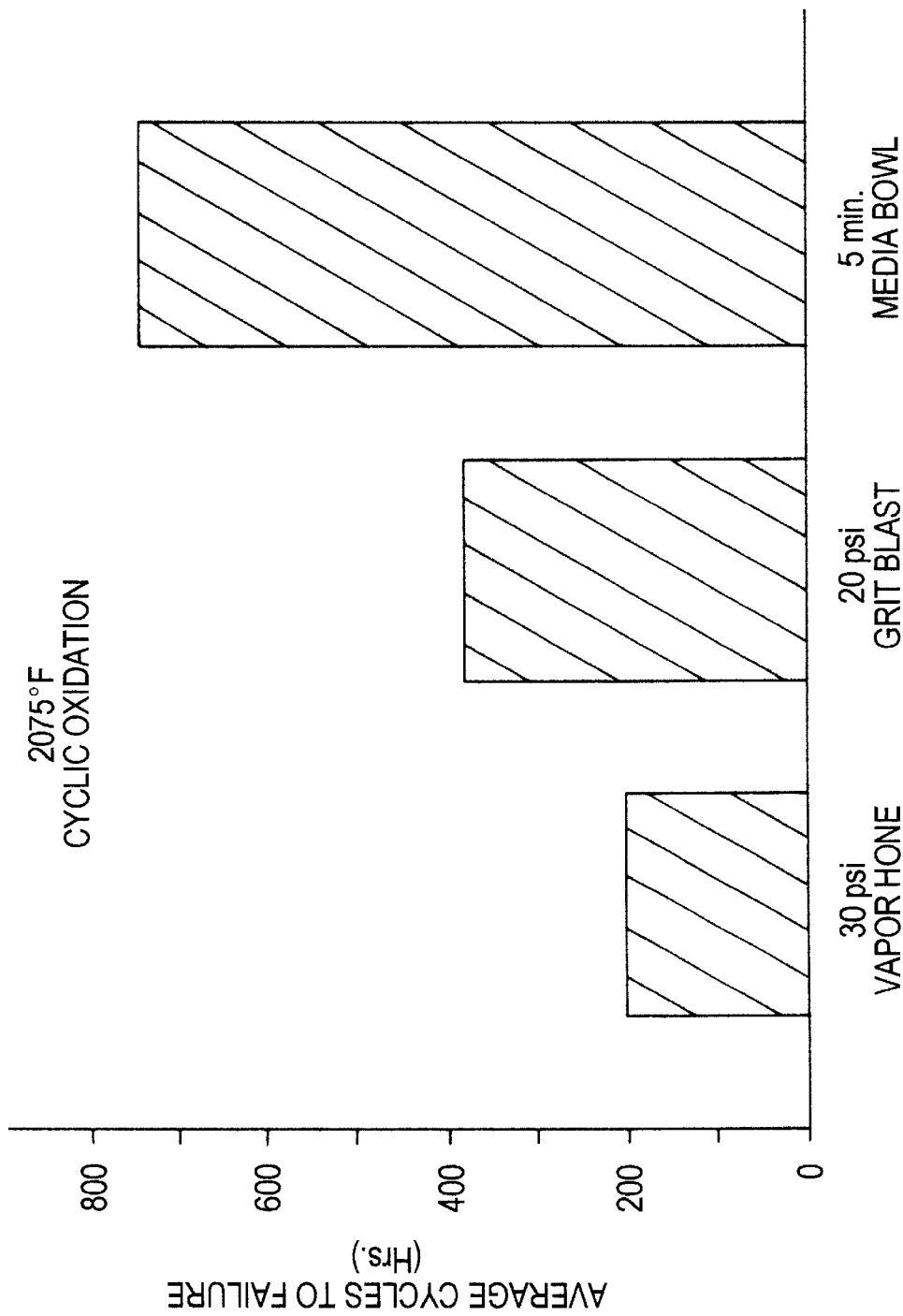
FIG. 2 is a bar graph of average cycles to failure of thermal barrier coating systems wherein the bondcoat was pretreated by vapor honing, grit blasting and media bowl polishing pursuant to the invention.
Figure 4A:
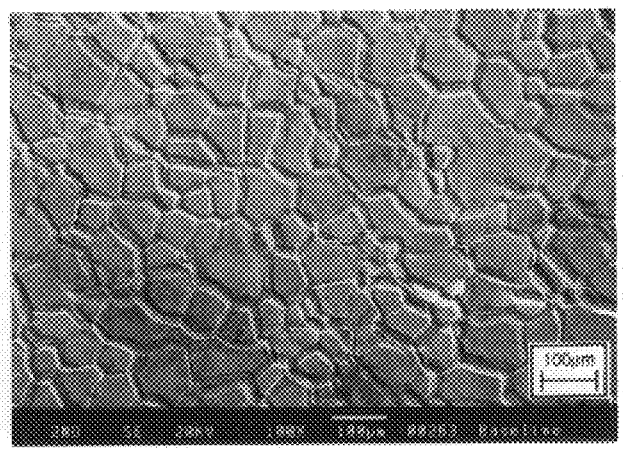
FIG. 4A is a photomicrograph of a Pt modified diffusion aluminide coating before media polishing.
Figure 4B:
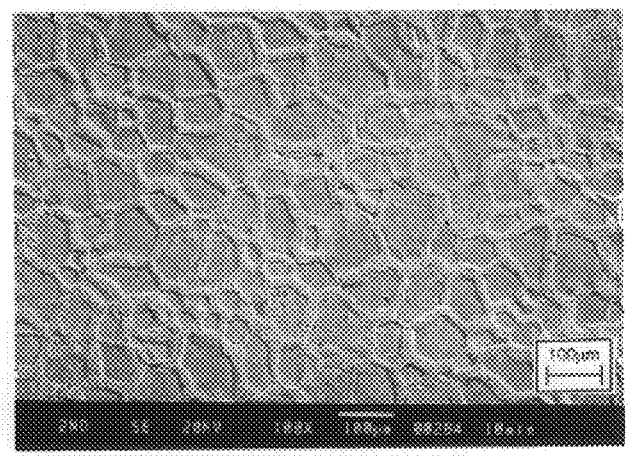
FIG. 4B is a photomicrograph of the Pt modified diffusion aluminide coating after media polishing for 10 minutes.
Figure 4C:
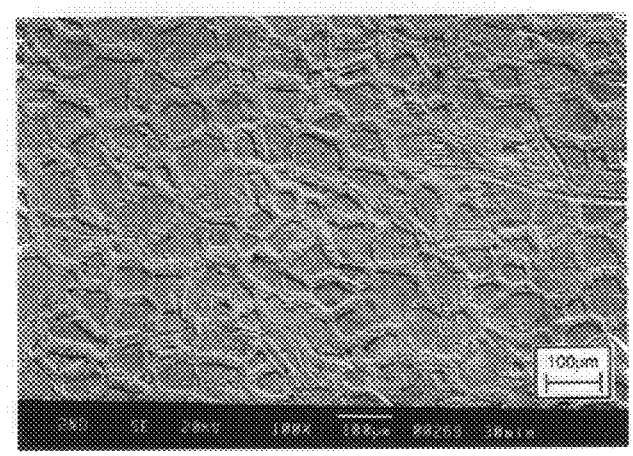
FIG. 4C is a photomicrograph of the Pt modified diffusion aluminide coating after media polishing for 30 minutes.
Figure 5A:
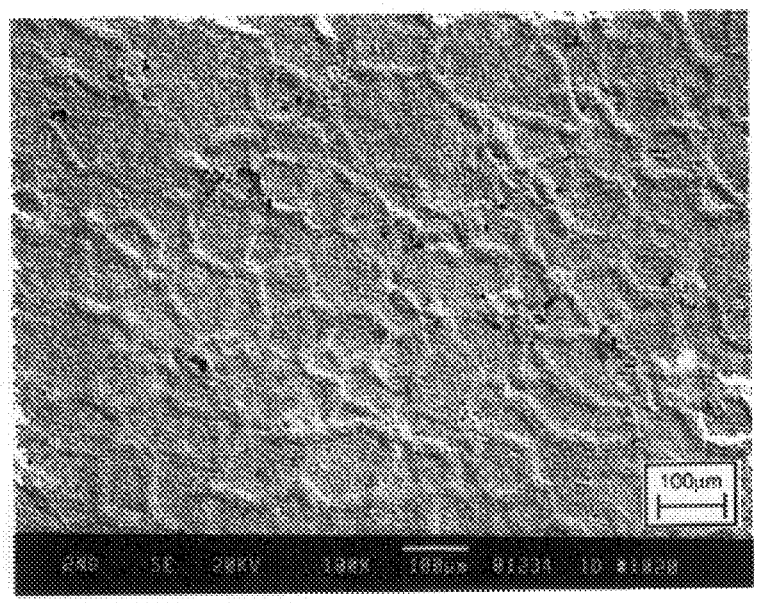
FIG. 5A is a photomicrograph of a Pt modified diffusion aluminide coating after vapor honing at 20 psi.
Figure 5B:
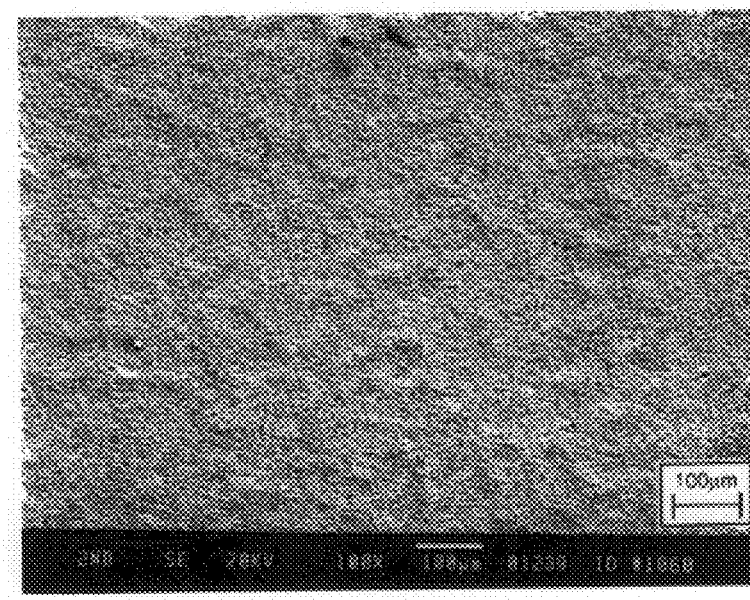
FIG. 5B is a photomicrograph of the Pt modified diffusion aluminide coating after vapor honing at 60 psi.
Figure 6A:
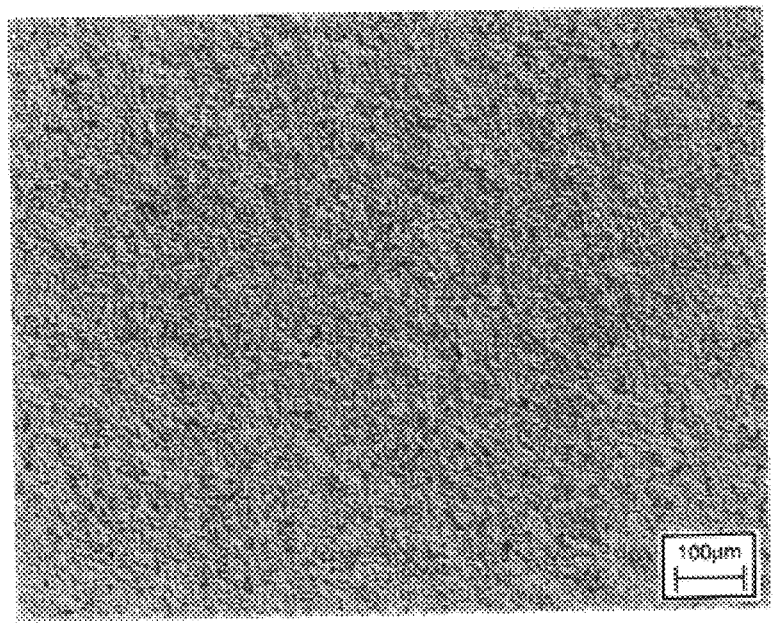
FIG. 6A is a photomicrograph of a Pt modified diffusion aluminide coating after grit blasting at 20 psi.
Figure 6B:
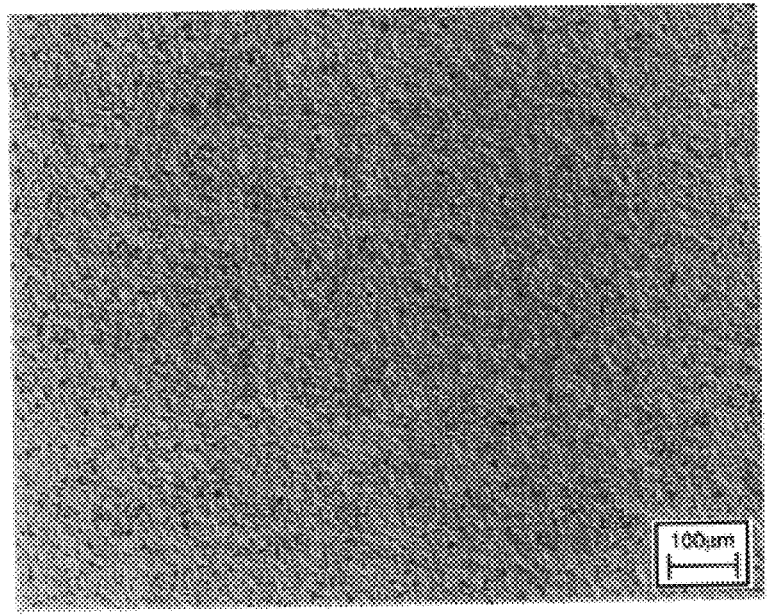
FIG. 6B is a photomicrograph of the Pt modified diffusion aluminide coating after grit blasting at 40 psi.

FIG. 2 summarizes the cyclic oxidation test results where it can be seen that the media bowl polishing pursuant to the invention produced the longest coating life of the three bondcoat surface treatments conducted. The significant advantage of the media bowl polishing over the vapor honed and grit blasted bondcoated substrates results from reduction or elimination of raised grain boundary surface ridges on the outermost surface of the bondcoat without removing any of the Pt and Al-rich outermost additive layer or region of the bondcoat as shown in FIGS. 4B and 4C compared to FIG. 4A. That is, the grain boundary ridges are preferentially removed in FIG. 4B as evidenced by abrasive scratch marks on the raised ridges and not on the grains enclosed by the grain boundary ridges. In FIG. 4C, abrasive scratch marks are present on the grain boundary ridges and some of the grain surfaces, indicating that the ridges are nearly removed level with the grain surfaces at the outer surface of the bondcoat without removing any of the Al and Pt-rich outer additive layer of the bondcoat. Media bowl polishing for 5 minutes improved the life (e.g. 742 cycles) of the thermal barrier coated substrate by 42% in the cyclic oxidation tests as compared to that (e.g. 525 cycles) of similar thermal barrier coated substrate prepared without media bowl polishing; i.e. with no surface treatment except air preoxidation.

In contrast, vapor honing and grit blasting removed substantial portions of the Pt and Al-rich outermost additive layer or region as shown in FIGS. 5A, 5B and 6A, 6B in a manner that adversely affected coating life in the cyclic oxidation tests. Both the vapor honing and grit blasting surface treatments failed to produce an improvement in the life of the thermal barrier coated substrate as compared to that of a similar thermal barrier coated substrate prepared with no surface treatment at all. FIGS. 5 and 6 evidence gross removal [e.g. tenths of a mil (mil=0.001 inch) of bondcoat removed] of the bondcoating itself to the detriment of oxidation resistance.

Figure 3:
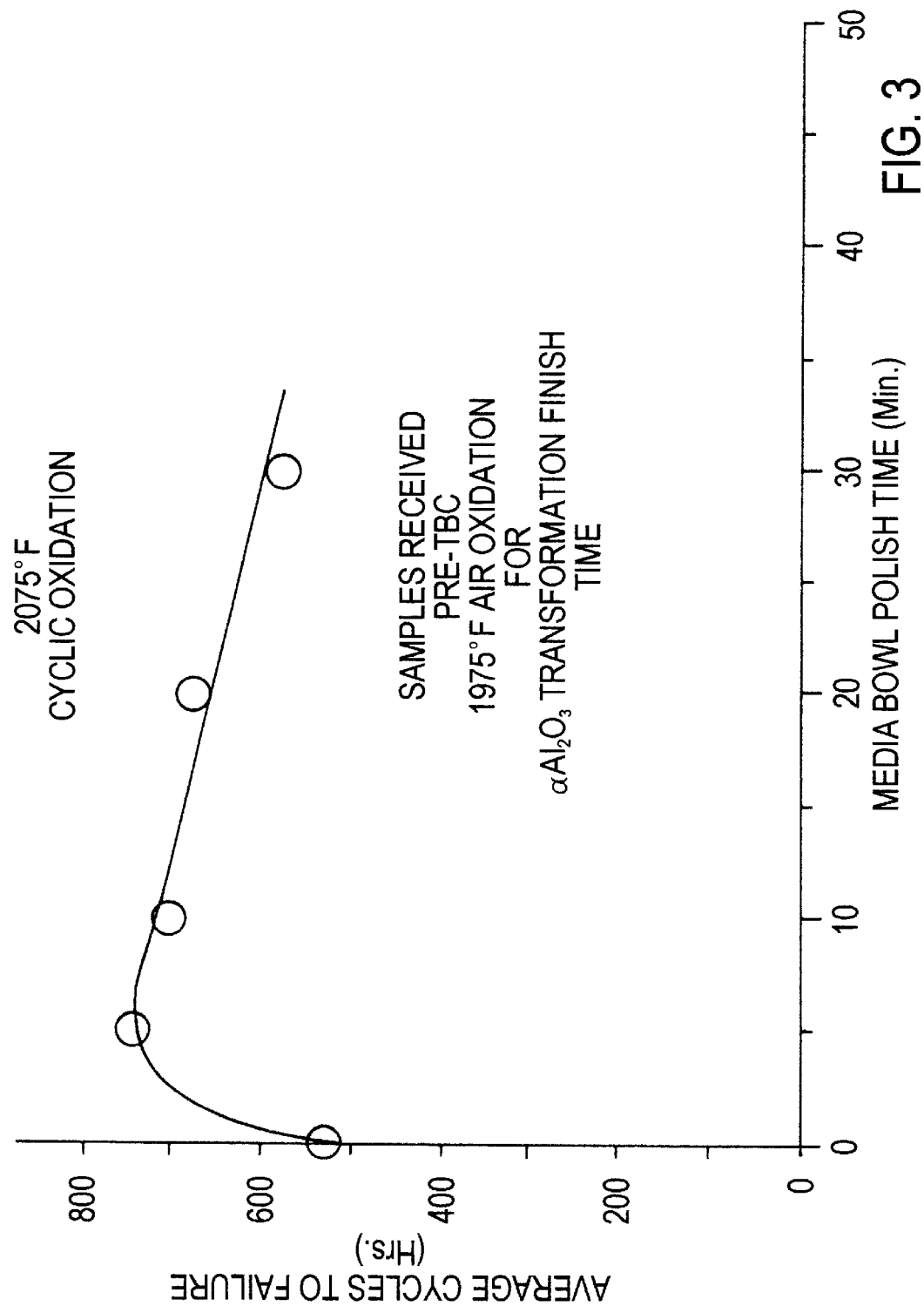
FIG. 3 is a graph of average cycles to failure of thermal barrier coating systems wherein the bondcoat was pretreated by media bowl polishing for different times.

FIG. 3 illustrates life of the thermal barrier coated substrates prepared as above using media bowl polishing pursuant to the invention with, however, the time of media bowl polishing being varied. In these cyclic oxidation tests, the media bowl polished bondcoated substrates were heat treated at 1975 degrees F. for sufficient time in air, FIG. 8, to form a completely transformed alpha alumina layer or scale on the bondcoat before deposition of the yttria stabilized zirconia layer. Although the life of the thermal barrier coated substrates started to decrease with increasing media bowl polishing beyond about 5 minutes, media bowl polishing for about 3 to about 10 minutes significantly improved the life of the thermal barrier coated substrate. Even after 30 minutes of media bowl polishing, the thermal barrier coated substrates still exhibited better life (e.g. about 575 cycles) in the cyclic oxidations tests as compared to that (e.g. 525 cycles) of similar thermal barrier coated substrate prepared without media bowl polishing; i.e. with no surface treatment except air preoxidation.

Although the invention has been described hereabove with respect to forming an outwardly grown Pt modified diffusion aluminide coating by CVD processing, the invention is not so limited and can be practiced by forming an outwardly grown simple diffusion aluminide coating devoid of Pt on the substrate using CVD processes of the type described above. Also, the outwardly grown diffusion aluminide coatings may include one or more active elements selected from Hf, Zr, Si, Y, La, and Ce with or without platinum and also can be made by CVD, pack, above-the-pack and other vapor phase coating processes.

The present invention also involves heat treating the pretreated bondcoated substrate under temperature and time conditions in an oxygen-bearing atmosphere to form a thermodynamically stable alpha alumina layer on the bondcoat prior to application of the thermal insulative layer. Rene' N5 substrates coated with the above bondcoat were subjected to various air heat treatments at 1950, 1975, 2000, and 2150 degrees F. for various times. The resulting transformation start $T_s$ and transformation finish $T_f$ times with respective temperatures for the formation of alpha alumina on the bondcoat are shown in Table I.

TABLE I

| Temperature (degrees F.) | Transformation Start ($T_s$) | Transformation Finish ($T_f$) |
|---|---|---|
| 1950 | 1 hour | about 8 hours |
| 1975 | 30 minutes | less than 1 hour |
| 2000 | 30 minutes | less than 1 hour |
| 2150 | less than 10 minutes | less than 30 minutes |

Table I reveals that a stable alpha alumina layer can be formed on the bondcoat by heat treatment at temperatures of 1950 degrees F. and above within approximately 8 hours and less. Higher temperatures considerably reduced the heat treatment time to form the fully transformed alpha alumina layer on the bondcoat.

Figure 7:
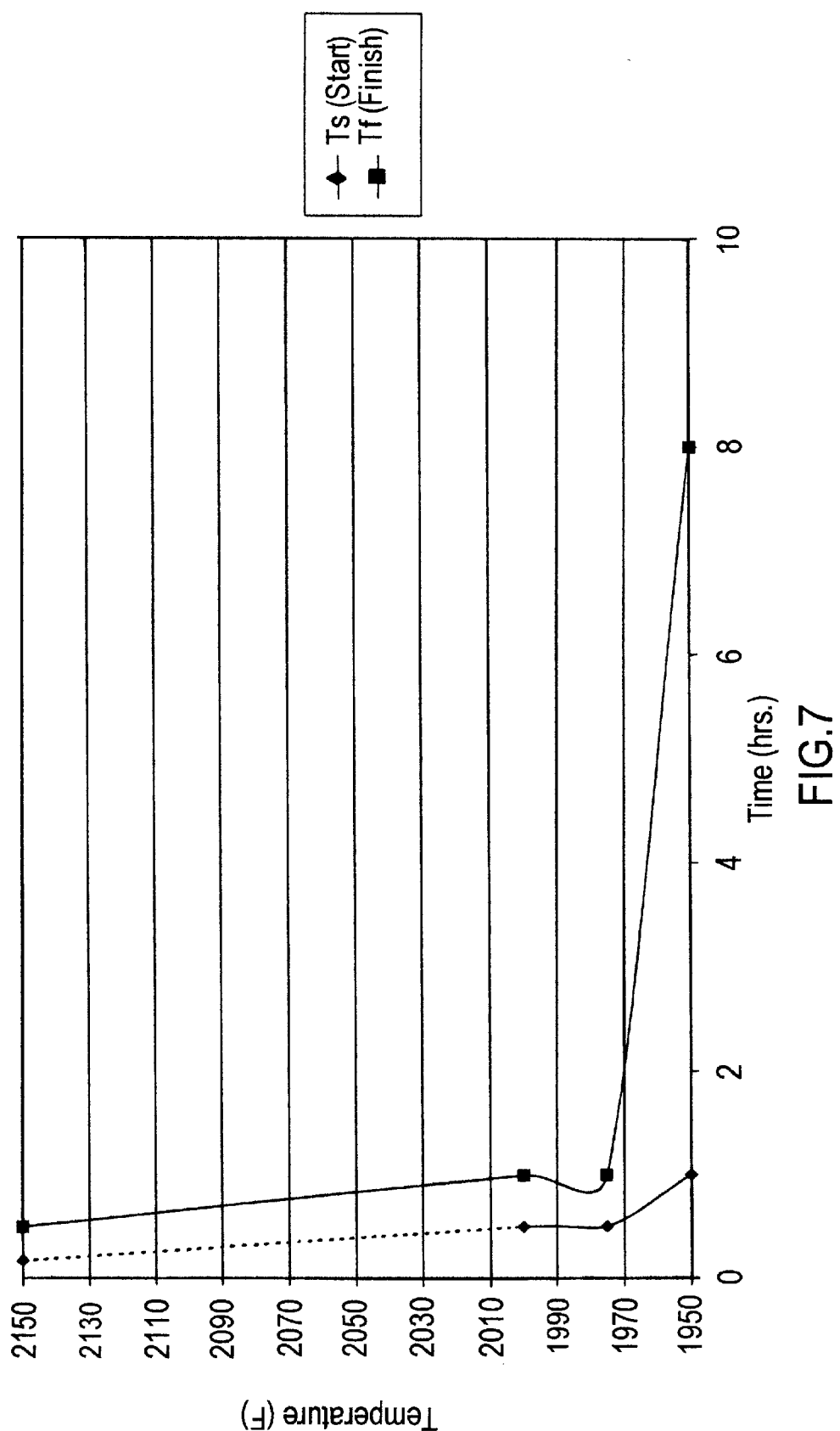
FIG. 7 is a time-temperature-transition diagram for alpha alumina formation on an untreated (unworked) outwardly grown platinum modified diffusion aluminide.

The $T_s$ and $T_f$ data points were chosen with respect to the time at which the stable alpha alumina phase peaks ($T_s$) were first detected by X-ray diffraction analysis and when the last theta alumina peaks were no longer detectable ($T_f$). From these air heat treatment data points, a time-temperature-transformation (TTT) diagram was developed and is shown in FIG. 7. In FIG. 7, the 2150 degree F. $T_s$ was extrapolated.

Further, Rene' N5 substrates coated with the CVD Pt aluminide MDC-150L bondcoats without any bondcoat surface treatment were preoxidized in air at 1975 degrees F. for 30 minutes and then examined by X-ray diffraction both prior to and after a standard pre-heat cycle (i.e. 40 minutes at 1950 degrees F. in vacuum of 6 microns) employed in the conventional EB-PVD coater in which the yttria stabilized zirconia was deposited on the bondcoat. X-ray diffraction analysis indicated that the transformation from theta alumina to alpha alumina was not complete following pre-oxidation and did not proceed during the EB-PVD pre-heat operation. These results suggest that the optimum fully transformed alpha alumina layer to maximize life of the thermal barrier coated substrate cannot be formed during the EB-PVD pre-heat cycle, or any other thermal process at reduced oxygen pressure and temperatures at or below 1950 degrees F. Thus, pursuant to a preferred embodiment of the invention, the substrate is heat treated in air at temperatures of about 1950 degrees F. and higher for appropriate times to form the alpha alumina layer prior to placing the bondcoated substrate in the EB-PVD coater that is used to deposit the ceramic insulative layer. The bondcoat can be heated in air at a temperature in the range of about 1900, preferably about 1950, to about 2200 degrees F. for 1 to 500 minutes to form the alpha alumina layer.

Although the invention has been described in detail above with respect to certain embodiments, those skilled in the art will appreciate that modifications, changes and the like can be made therein without departing from the spirit and scope of the invention as set forth in the appended claims.

We claim:

1. In a method of forming a thermal barrier coating system on a substrate, the steps comprising:
    forming on said substrate a diffusion aluminide bondcoat that has a higher concentration of Al and a lower concentration of a refractory metal at an outermost region of the bondcoat than at an innermost region thereof that is adjacent said substrate, and
    repetitively moving the bondcoated substrate and abrasive particle media in contact in a container to reduce grain boundary ridges on said bondcoat while leaving at least a portion of said outermost region of said bondcoat.

2. The method of claim 1 wherein said bondcoated substrate and said abrasive particle media are repetitively moved in contact in a media bowl polishing container to reduce said grain boundary ridges without removing said outermost region of said bondcoat.

3. The method of claim 2 wherein said media bowl polishing occurs for about 2 to about 10 minutes.

4. The method of claim 1 wherein said bondcoated substrate is heated in air to at least 1950 degrees F. for a time of 8 hours or less to form an alpha phase alumina layer on said bondcoat.

5. The method of claim 4 further including depositing a ceramic layer on the alpha phase alumina layer.

6. The method of claim 1 wherein said bondcoat is formed by chemical vapor deposition at a temperature of at least 1832 degrees F.

7. The method of claim 1 wherein an outwardly grown platinum modified diffusion aluminide bondcoat is formed on the substrate and has higher concentrations of Al and Pt and a lower concentration of a refractory metal at an outermost region of the bondcoat than at an innermost region thereof.

8. A method of forming a thermal barrier coating system on a substrate, comprising
    forming on a said substrate a diffusion aluminide bondcoat that has a higher concentration of Al and a lower concentration of a refractory metal at an outermost region of the bondcoat than at an innermost region thereof, and
    heating the bondcoat in air at a temperature of at least 1900 degrees F. for sufficient time to form an alpha phase alumina layer on the bondcoat, and
    depositing a ceramic layer on the alpha alumina layer.

9. The method of claim 8 wherein the bondcoat is heated in air at a temperature in the range of about 1900 to about 2200 degrees F. for 1 to 500 minutes.

10. In a method of forming a thermal barrier coating system on a substrate, the steps comprising:
    forming on said substrate a diffusion aluminide bondcoat that has a higher concentration of Al and a lower concentration of a refractory metal at an outermost region of the bondcoat than at an innermost region thereof that is adjacent said substrate, and
    abrading said bondcoat by repetitively moving the bondcoated substrate and abrasive particle media in contact in a container for a time to reduce grain boundary ridges on said bondcoat without removing said outermost region of said bondcoat.

11. The method of claim 10 wherein said bondcoat is abraded by media bowl polishing wherein said bondcoated substrate and said abrasive particle media are repetitively moved in contact in a vibrating container.

12. The method of claim 10 including after said abrading step, heating the bondcoated substrate in air to an elevated temperature of at least 1900 degrees F. for a time of 1 to 500 minutes to form an alpha phase alumina layer on the bondcoat.

13. The method of claim 12 wherein said bondcoated substrate is heated to at least 1950 degrees F. for a time of 8 hours or less.

14. The method of claim 12 further including depositing a ceramic layer on the alpha phase alumina layer.

* * * * *